United States Patent [19]
Powell et al.

[11] Patent Number: 5,210,839
[45] Date of Patent: May 11, 1993

[54] METHOD AND APPARATUS FOR PROVIDING A MEMORY ADDRESS FROM A COMPUTER INSTRUCTION USING A MASK REGISTER

[75] Inventors: Michael Powell, Palo Alto; Robert Cmelik, Sunnyvale; Shing Kong, Mountain View; David Ditzel, Los Altos Hills; Edmund Kelly, San Jose, all of Calif.

[73] Assignee: Sun Microsystems, Inc., Mountain View, Calif.

[21] Appl. No.: 912,077

[22] Filed: Jul. 8, 1992

Related U.S. Application Data

[63] Continuation of Ser. No. 631,967, Dec. 21, 1990, abandoned.

[51] Int. Cl.[5] .............................................. G06F 12/04
[52] U.S. Cl. .................................... 395/400; 364/749; 395/775
[58] Field of Search ... 364/200 MS File, 900 MS File, 364/736, 736.5, 748, 749; 395/775

[56] References Cited

U.S. PATENT DOCUMENTS

| | | | |
|---|---|---|---|
| 4,199,811 | 4/1980 | Borgerson et al. | 395/800 |
| 4,234,919 | 11/1980 | Bruce et al. | 395/325 |
| 4,414,622 | 11/1983 | Matsumoto | 395/400 |
| 4,521,846 | 6/1985 | Scalzi et al. | 395/425 |
| 4,592,005 | 5/1986 | Kregness | 364/736 |
| 4,592,476 | 9/1985 | Nagafuji | 364/749 |
| 4,729,095 | 3/1988 | Culley et al. | 395/375 |
| 4,779,195 | 10/1988 | James | 395/275 |
| 4,841,438 | 6/1989 | Yoshida et al. | 395/800 |
| 4,945,472 | 7/1990 | Sakamura et al. | 395/775 |
| 4,961,161 | 10/1990 | Kojima | 364/736.5 |
| 5,074,558 | 12/1991 | Bleich et al. | 273/121 A |
| 5,091,874 | 2/1992 | Watanabe et al. | 364/715.1 |

OTHER PUBLICATIONS

Shiva, "Computer Design and Architecture", 1985, p. 336.

*Primary Examiner*—Robert L. Richardson
*Assistant Examiner*—Lance Leonard Barry
*Attorney, Agent, or Firm*—Blakely Sokoloff Taylor & Zafman

[57] ABSTRACT

A method and apparatus are provided for enabling a computer that is capable of running programs utilizing different address sizes to run those programs without having to modify the computer's hardware. A mask register is used to identify bits of a sum of register addresses that are valid for the program that is running. The number of valid bits in the register mask can be changed to correspond to the addressable memory size for different programs.

13 Claims, 3 Drawing Sheets

METHOD AND APPARATUS FOR PROVIDING A MEMORY ADDRESS FROM A COMPUTER INSTRUCTION USING A MASK REGISTER

This is a continuation of application Ser. No. 07/631,967, filed Dec. 21, 1990 now abandoned.

BACKGROUND OF THE INVENTION

1. Field of the Invention

This invention relates to computer systems and, more particularly to apparatus for providing masking which may be useful in extending a computer architecture from thirty-two to sixty-four bits and for other, more general, purposes.

2. History of the Prior Art

As computers have improved in speed and ability, there has been a constant demand for more addressable memory. The size of the address directly controls the size of memory which may be addressed. Each additional bit in an address doubles the amount of addressable memory. Thus, a system using sixty-four bit addresses provides two to the thirty-second power more addresses than does a system using thirty-two bit addresses. Consequently, researchers are today attempting to develop computer systems based on sixty-four bit architectures.

On the other hand, very powerful computer systems exist today which use thirty-two bit addresses. A very large amount of effective software exists for such systems for which substantial investments have already been made. These thirty-two bit systems could effectively handle larger and larger problems if there were an easy way to simply address more memory. Presuming that the only effective way to obtain more memory is to design systems using larger (e.g., sixty-four bit) addresses, it would be very foolish and economically disastrous to simply discard all of the effort presently invested in the design of thirty-two bit systems and their software. For this reason, it is an a priori requirement that any new computer system based on a new memory size for an existing architecture be able to use the old programs on the new architecture. A primary question in the design of such a system is, therefore, how to change memory address size and still be able to use the old programs on the new architecture.

A new system has been devised in which the hardware is able to handle both old thirty-two bit and new sixty-four bit programs using the same circuitry. This new system is simply able to run either old or new programs without any great amount of new hardware except essentially, that necessary to allow the larger addresses to be utilized and without any rewriting of old software to fit the new hardware. One portion of the new system is disclosed in U.S. patent application, Ser. No. 07/632,017, entitled METHOD AND APPARATUS FOR EXTENDING COMPUTER ARCHITECTURE FROM THIRTY-TWO TO SIXTY-FOUR BITS, Powell et al, filed on even date herewith and assigned to the assignee of this invention. The system utilizes an integer processor having registers designed to run programs of the largest one of the word sizes. Because of the use of two's complement arithmetic in such a processor, almost all arithmetic operations increase in size toward the most significant bit. Since the new register size provides thirty-two extra bits beyond the most significant bit used in thirty-two bit registers, almost all arithmetic operations for both formats may be carried out in the new register size without significant changes. For most instructions, a thirty-two bit program merely ignores the upper thirty-two bits. However, in certain operations carried on in thirty-two bit format, addresses are generated in the processor registers. The generation of these addresses may utilize more than the lower thirty-two bits of the sixty-four bit positions in the register. If these operations use more than a thirty-two bit address, then the operations will be carried out incorrectly. In order to assure that invalid information is not included when using a thirty-two bit address in a sixty-four bit register to load or store, the processor requires a method of masking the high order bits of the address.

Once an arrangement for masking high order bits of an address has been realized, it will be apparent to those skilled in the art that such an arrangement may find greater use than in allowing two different sizes of programs to be run in the same registers. For example, the ability to mask high order bits allows those bits to be used for a number of other purposes which are especially advantageous where a large address space is available yet may not find complete use.

SUMMARY OF THE INVENTION

It is, therefore, an object of the present invention to provide apparatus for allowing a computer system to run both thirty-two bit programs and sixty-four bit programs.

It is another object of the present invention to provide an apparatus for allowing a computer system to utilize existing register space in processor address registers where addresses are less than the register space.

It is yet another object of the present invention to provide apparatus for allowing a computer system to vary the size of addresses used with registers of a particular processor.

It is another more specific object of the present invention to provide apparatus for allowing a computer system to load and store existing thirty-two bit programs and new sixty-four bit programs without any substantial increase in hardware and without requiring a modification of the existing thirty-two bit software.

It is yet another more specific object of the present invention to provide a mask register for an integer processor by which the processor may load and store information using addresses for both thirty-two programs and sixty-four bit programs.

These and other objects of the present invention are realized in a computer capable of running computer programs of different word sizes on a processor having registers designed to run programs of a largest one of the word sizes, by a register for storing indications of bit positions which are invalid in a program of a particular word size, and by means for utilizing the indications of bit positions which are invalid in a program of a particular word size to mask the bits of an address held in a register and used to transfer information between a register and memory so that only valid bits of an address are utilized.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals are bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

U.S. patent application Ser. No. 07/632,017, referred to above, discloses a method and apparatus for enabling a sixty-four bit integer processor to save and restore register files for both sixty-four bit and thirty-two bit programs through the use of bits placed in the stack pointer register to indicate the type of program. The apparatus includes a unique arrangement for storing both sixty-four and thirty-two bit register files in the memory space. The method and apparatus disclosed in this patent application helps to allow a computer system to utilize sixty-four bit registers to run both thirty-two bit and sixty-four bit programs in the processor with the sixty-four bit registers.

Figure 1:
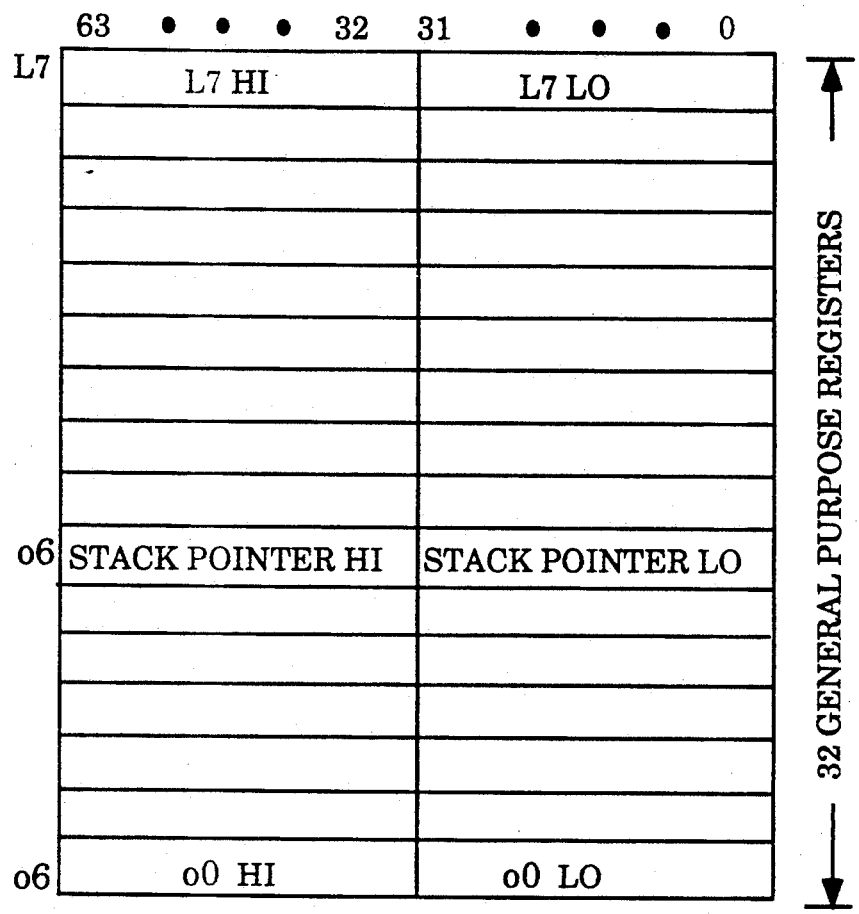
FIG. 1 is an illustration of the register file used in a processor designed in accordance with the teaching of a copending patent application.

FIG. 1 illustrates a sixty-four bit register file utilized in the integer processor referred to above. The particular register file illustrated is designed for use in a SPARC architecture computer; machines using the SPARC architecture are designed, manufactured, and sold by Sun Microsystems, Inc., Mountain View, Calif. The register file contains thirty-two individual registers each capable of storing sixty-four bits of binary information. The bit positions in each of the registers are indicated at the top of the register file in the figure. The words stored in the sixty-four bit registers conform in all important respects to the words used in thirty-two bit SPARC architecture so that programs of both thirty-two and sixty-four bits may both be run by the processor. However, the high order bit in the stack pointer register is marked in order to distinguish thirty-two bit procedures from sixty-four bit procedures so that state may be saved and restored for programs of both sizes upon the occurrence of a trap.

In general, if the register model is extended without changing the instructions, then instructions can operate on both thirty-two and sixty-four bit programs. One problem which exists with the use of the same sixty-four bit registers for both thirty-two and sixty-four bit programs occurs upon load and store operations. The upper thirty-two bits in a sixty-four bit register have no meaning for most of the thirty-two bit instructions. However, this is not true of the load and store instructions in the SPARC architecture. The load and store instructions typically form memory addresses by arithmetically manipulating data in one register with data in another register to determine an address in memory. There are one or two other instructions which in a similar manner compute memory addresses in the processor and are affected in the same manner as the load and store instructions by the extra register space.

Figure 2:
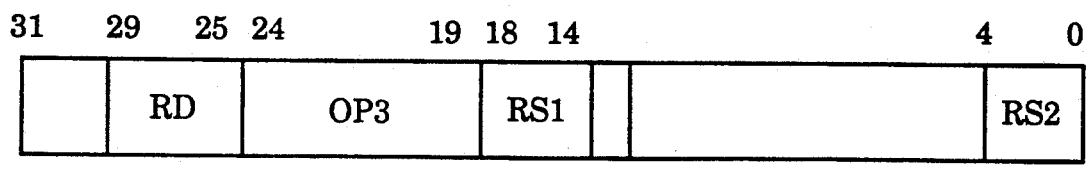
FIG. 2 is an illustration of an instruction used in a processor utilizing the invention.

FIG. 2 illustrates a thirty-two bit load instruction in the SPARC architecture. The information in the OP3 field of the instruction typically causes the formation of an address by adding the values held in the two registers designated in the RS1 and RS2 fields. The information at that memory address is then placed in the register designated in the RD field. Since the registers of the register file include sixty-four bit positions in the new processor, when data in a thirty-two bit program is manipulated in the registers RS1 and RS2 to obtain a thirty-two bit address from which to load or into which to store, the RS1 and RS2 registers may include a number of high order bits which are not related to the thirty-two bit program, essentially garbage bits. If these bits are used in the addressing, memory will be incorrectly addressed, and this will substantially affect the outcome of the program being run. Consequently, these high order bits must be masked off in some manner when thirty-two bit load and store instructions are being run.

In the preferred embodiment of the present invention, a mask register is used to store information relating to the particular bits of the register file which are to be used. When a procedure is loaded to or stored by the register file, the mask register is used to force the state of the upper bits of the address in the register which would otherwise be invalid to zero.

Figure 3:
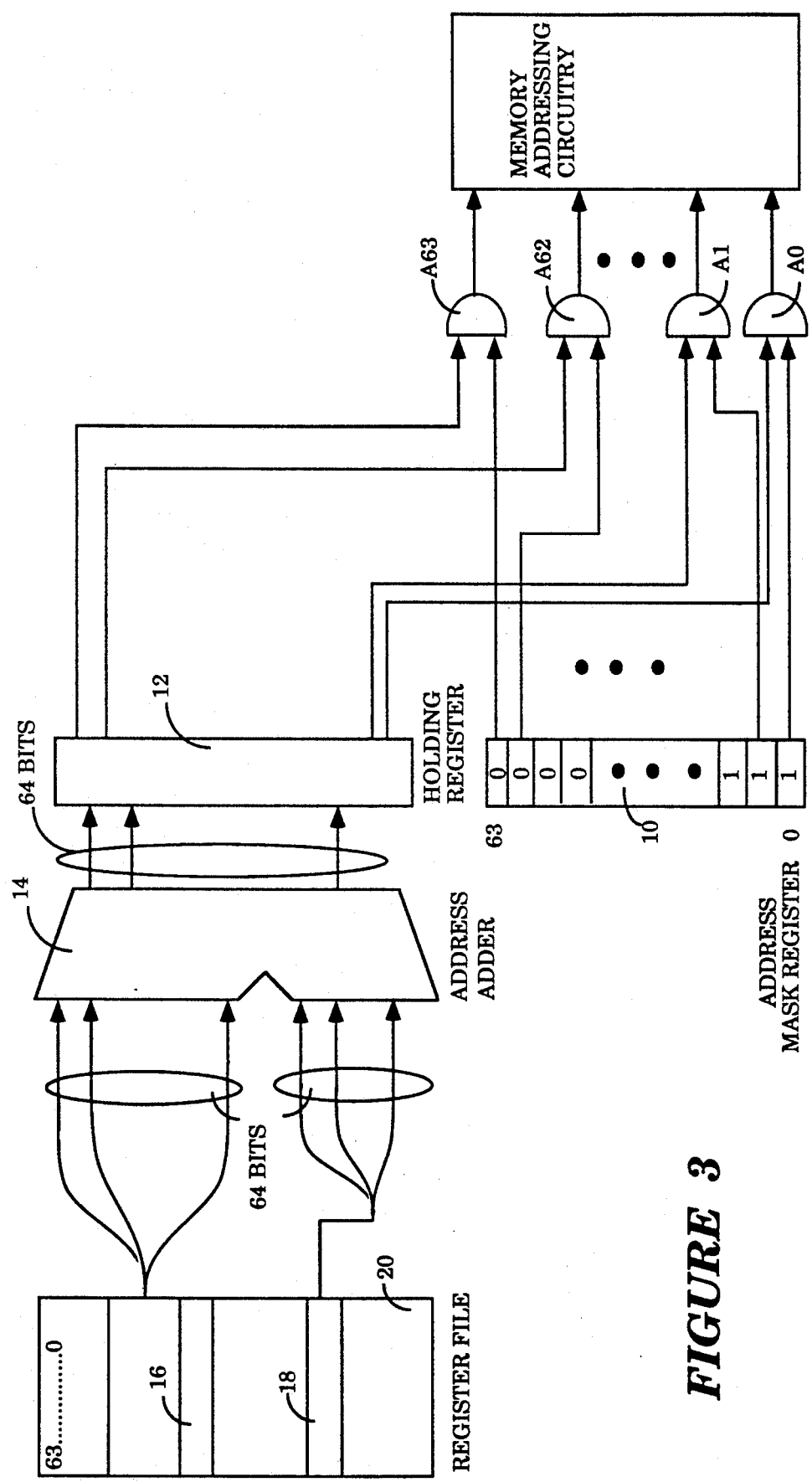
FIG. 3 is a block diagram of a mask register constructed in accordance with the present invention.

FIG. 3 illustrates a mask register 10 designed in accordance with the present invention for accomplishing the masking function. The register 10 may include a plurality of bits positions sufficient to accomplish the masking required. For example, if thirty-two bit positions are to be masked, the register 10 may include thirty-two bit positions. In the preferred embodiment of the invention, the register 10 includes a total of sixty-four bits positions so that the register 10 may be utilized for a number of different purposes. Each bit position of the register 10 is connected to an AND gate A0-A63. In a like manner, each of the sixty-four bit position of a holding register 12 is connected as another input to the appropriate one of the AND gates AO-A63. The holding register 12 receives the address from an address adder 14. In the example of FIG. 3, the address adder 14 combines the contents of registers 16 and 18 in a general register file 20 to provide the address in the holding register 12. When the stack pointer indicates that a particular procedure is a thirty-two bit procedure and that a load or store instruction is being executed, the mask register has zeroes placed in all thirty-two high order bits. When the address is read from the holding register 12, each bit is anded with the bit stored in the equivalent position of the mask register 10. For each position above bit position 31, the anding will produce a zero. For each position below bit 32, the anding will produce whatever is stored in that bit position of the holding register 12. In this manner, a load or store instruction for a thirty-two bit procedure will have the high order bits of the address masked so that no invalid bits will be used in addressing memory.

It should be noted that the mask register 10 may be used for other purposes once included in the circuitry of the integer processor. For example, it may be desirable for certain purposes to be able to address memory using other than the typical number of bits (thirty-two or sixty-four). In such a case, the system may set the mask register 10 to mask off only the number of bits desirable to the particular procedure. For example, if a procedure were to use fifty-four bits in an address, only the upper ten bits of the mask register might be provided with zeroes. This allows the system to provide a very large number of different work formats without any change to the architecture of the system. Once bits have been masked to zeroes, it is also possible to utilize these bits for other purposes. For example, it may be found desirable to utilize the masked bits to store information such as tag bits which may be utilized for other than the typical uses of bits in the integer registers. The masked bits may also be used in the manner described in the above-mentioned patent application to provide an indication in particular registers (the stack pointer) that a procedure is of a particular format. These additional advantages provides a substantial facility to a computer system utilizing the present invention.

Figure 4:
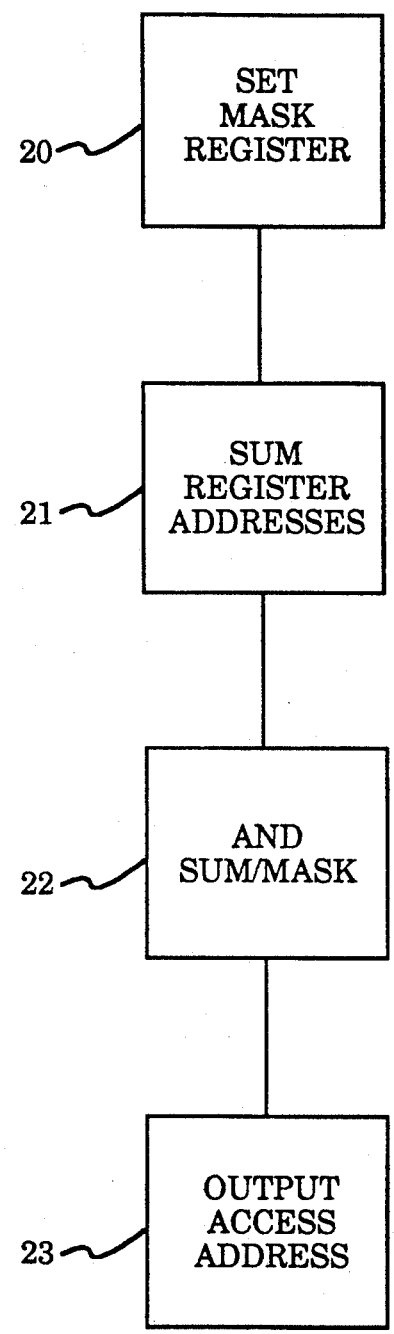
FIG. 4 is a flowchart illustrating the steps of method which operates in accordance with the present invention.

Referring now to FIG. 4, a flowchart identifying the steps of a method in accordance with a preferred embodiment of the present invention is shown. The first step 20 is to set the bits of the mask register to one which will identify which bits are valid bits and to set those bits in the mask register to zero which will identify invalid bits. The next step 21 is to sum the contents of two of the registers from a general register file using an address adder as described with respect to FIG. 3. Next, at step 22, the sum of the addresses is compared to the bits held in the mask register by performing a logical AND operation with the mask bits and the summed address bits. At step 23, those bits corresponding to bit positions where the mask registers had a one will result in an output address which can access the memory without being susceptible to non-address data that might be stored in the invalid bits of the registers in the general register file.

Such a facility may also be desirable in a processor in which only a single address size is normally used. For example, the ability to mask bits in a register holding addresses and use those bits for other purposes may well be useful in any system where a very large address size is available in registers.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer system which performs a plurality of instructions when executing a program, said program utilizing a memory having a maximum memory address size of a first word size, said computer system comprising a plurality of multi-bit registers, each multi-bit register having a second word size greater than said first word size, said plurality of instructions comprising a first instruction that designates a first set of at lest two of said plurality of multi-bit registers to be added to form an access address for accessing memory, said access address being a sum of contents of a first subset of bits of said first set of registers to be added, an apparatus for providing said access address comprising:

addition means for adding contents of a set of said registers to be added, said addition means coupled to each of said registers to be added, and outputting a sum of said contents of said set of registers;

valid bit specification means for specifying a set of valid bits of said output sum to be used to provide said access address, said set of valid bits being equal in size to said first word size if said first instruction is being performed;

valid bit extraction means coupled to said addition means and said valid bit specification means for extracting said contents of said set of valid bits from the sum to provide said access address, said valid bit extraction means responsive to said valid bit specification means;

memory addressing circuitry for accessing said memory coupled to said valid bit extraction means;

means for outputting said access address directly from said valid bit extraction means to said memory addressing circuitry to responsively access said memory at said access address;

wherein a first instruction having a word size less than the work size utilized by the computer system can be executed without being affected by data present in bits of said plurality of multi-bit registers which are not valid bits.

2. The means for providing the access address as set forth in claim 1 wherein said specification means comprises a valid bit register, said valid bit register being a multi-bit register having the same number of bits as each register of said plurality of multi-bit registers has, each bit of said valid bit register containing a one if it is an element of said set of valid bits and zeros if it is not an element of said set of valid bits.

3. The means for providing the access address as set forth in claim 2 wherein said valid bit extraction means comprises a plurality of AND gates equal in number to said number of bits in each register of said plurality of multi-bit registers, each AND gate of said plurality of AND gates coupled to a bit of said output sum and a corresponding bit of said valid bit register and providing as output a corresponding bit of said access address.

4. The means for providing the access address as set forth in claim 1, wherein said bits of said multi-bit registers which are not part of said set of valid bits are utilized to store data other than address calculation data.

5. In a computer system which performs a quality of plurality of instructions when executing a program, said program utilizing a memory having a maximum memory address size of a first word size, and memory addressing circuitry for accessing said memory, said computer system comprising a plurality of multi-bit registers, each multi-bit register having a second word size greater than said first word size, said plurality of instructions comprising a first instruction that designates a first set of at least two registers of said plurality of multi-bit registers to be added to form an access address for accessing memory, said access address being a sum of contents of a first subset of bits of said first set of at least two registers, a method for providing said access address comprising the steps of:

providing a set of valid bits, said set of valid bits equal in number to the size of said first word size if said first instruction is being performed;

summing contents of a set of registers to generate a summed address;

performing a logical AND operation with the valid bits and the summed address to generate the access address;

coupling said access address directly to said memory addressing circuitry to responsively access said memory at said access address;

wherein said first instruction having a word size less than the word size of the computer system can be executed without being affected by data present in bits of said plurality of multi-bit registers which are not valid bits.

6. The method for providing the access address as set forth in claim 5 further comprising the steps of:

setting contents of each bit of a valid bit register which is an element of said set of valid bits to one if said valid bit register bit is an element of said set of valid bits, said valid bit register being a multi-bit register having as many bits as each register of said plurality of multi-bit registers; and setting contents of each bit of said valid bit register which is not an element of said set of valid bits to zero.

7. The method for providing the access address as set forth in claim 6 wherein the step of logically ANDing the valid bits with the summed address to generate the access address comprises the step of performing a logical AND operation within a plurality of AND gates equal in number to the number of bits in a register of said plurality of multi-bit registers, each AND gate of said plurality of AND gates coupled to a bit of said summed address and a corresponding bit of said valid bit register and providing as output a corresponding bit of said access address.

8. The method for providing the access address as set forth in claim 5 further comprising the step of using said bits of said multi-bit registers which are not part of said set of valid bits to store data other than address calculation data.

9. In a computer system including means for outputting an access address of a first word size of (L) bits in conjunction with a first program designed for use in conjunction with said first word size of (L) bits, said means for outputting an access address of a first word size of (L) bits comprising a first register the size of said first word size of (L) bits, a second register the size of said first word size of (L) bits, an adder coupled to said first register and said second register, a holding register the size of said first word size of (L) bits coupled to said adder, a plurality of logic gates coupled to said holding register, and a mask register of said first word size of (L) bits coupled to said plurality of logic gates, wherein said access address is output directly from said plurality of logic gates, a method for outputting an access address of a second word size of (S) bits for a program designed for use in conjunction with said second word size of (S) bits, wherein said second word size of (S) bits is less than said first word size of (L) bits, said method comprising the steps of:

setting (S) bits in said mask register of said first word size of (L) bits equal to a first logic state;

setting (L−S) bits in said mask register of said first word size of (L) bits equal to a second logic state;

coupling a first plurality of bits in said first register of said first word size of (L) bits and a second plurality of bits in said second register of said first word size of (L) bits to said adder;

said adder adding said first plurality of bits and said second plurality of bits and coupling a result of said adding to said holding register of said first word size of (L) bits;

said holding register of said first word size of (L) bits coupling said result of said adding to said plurality of logic gates;

said mask register of said first word size of (L) bits coupling said (S) bits and said (L−S) bits set in said mask register to said plurality of logic gates;

said plurality of logic gates, responsive to said coupling of said result of said adding, said (S) bits, and said (L−S) bits to said plurality of logic gates, outputting an access address of said second word size of (S) bits.

10. The method of outputting an access address of a second word size (S) as provided in claim 9, wherein said logic gates are AND gates and said first logic state in the logical one state and said second logic state is the logical zero state.

11. The method for outputting an access address of a second word size (S) as provided in claim 10 wherein (S) equals 32 and (L) equals 64.

12. The method for outputting an access address of a second word size (S) as provided in claim 10, wherein said S bits are contiguous within said masking register of said first word size (L).

13. The method for outputting an access address of a second word size (S) as provided in claim 12, wherein said (L−S) bits are contiguous within said masking register of said first word size.

* * * * *

UNITED STATES PATENT AND TRADEMARK OFFICE
CERTIFICATE OF CORRECTION

PATENT NO. : 5,210,839
DATED : May 11, 1993
INVENTOR(S) : Powell et al.

It is certified that error appears in the above-identified patent and that said Letters Patent is hereby corrected as shown below:

In column 7, claim 5 at line 1, please delete " quality of ".

Signed and Sealed this

Eighteenth Day of November 1997

Attest:

BRUCE LEHMAN

*Attesting Officer*      *Commissioner of Patents and Trademarks*